United States Patent
Carmel et al.

(10) Patent No.: US 10,013,772 B2
(45) Date of Patent: Jul. 3, 2018

(54) METHOD OF CONTROLLING A QUALITY MEASURE AND SYSTEM THEREOF

(71) Applicant: BEAMR IMAGING LTD., Tel-Aviv (IL)

(72) Inventors: Sharon Carmel, Ramat Hasharon (IL); Dror Gill, Haifa (IL); Tamar Shoham, Netanya (IL); Udi Yehuda Shrot, Givat Shmuel (IL); Boris Filippov, St. Petersburg (RU)

(73) Assignee: BEAMR IMAGING LTD, Tel Aviv (IL)

( * ) Notice: Subject to any disclaimer, the term of this patent is extended or adjusted under 35 U.S.C. 154(b) by 0 days.

(21) Appl. No.: 15/528,472

(22) PCT Filed: Oct. 10, 2016

(86) PCT No.: PCT/IL2016/051104
§ 371 (c)(1),
(2) Date: May 19, 2017

(87) PCT Pub. No.: WO2017/085708
PCT Pub. Date: May 26, 2017

(65) Prior Publication Data
US 2017/0345170 A1    Nov. 30, 2017

Related U.S. Application Data

(60) Provisional application No. 62/256,168, filed on Nov. 17, 2015.

(51) Int. Cl.
*G06T 7/00* (2017.01)
*G06T 7/44* (2017.01)
(Continued)

(52) U.S. Cl.
CPC ............... *G06T 7/44* (2017.01); *G06T 5/002* (2013.01); *G06T 9/007* (2013.01); *G06T 2207/20024* (2013.01); *G06T 2207/30168* (2013.01)

(58) Field of Classification Search
None
See application file for complete search history.

(56) References Cited

U.S. PATENT DOCUMENTS

2002/0141650 A1* 10/2002 Keeney ............... H04N 19/115
                                                              382/239
2003/0151776 A1*  8/2003 Enomoto ........... H04N 1/00132
                                                              358/302

(Continued)

OTHER PUBLICATIONS

Hepper, Dietmar, Investigating Properties of Film Grain Noise for Film Grain Management, IEEE Third International Conference on Consumer Electronics, 2013, pp. 185-188.

(Continued)

*Primary Examiner* — Delomia L Gilliard
(74) *Attorney, Agent, or Firm* — Browdy and Neimark, PLLC

(57) ABSTRACT

There is provided a computerized method and system of controlling a quality measure in a compression quality evaluation system, the method comprising: calculating a grain value indicative of an extent of grain present in an input image, the grain value being calculated based on one or more features characterizing a base image related to the input image; and configuring the quality measure upon a criterion being met by the value, the quality measure being indicative of perceptual quality of a compressed image compressed from the input image. The calculated grain value may be dependent also on further characteristics of the (Continued)

input image, or in the case of a sequence of images, dependent also on the relation between the image and the preceding image.

38 Claims, 10 Drawing Sheets

(51) Int. Cl.
*G06T 5/00* (2006.01)
*G06T 9/00* (2006.01)

(56) References Cited

U.S. PATENT DOCUMENTS

| | | |
|---|---|---|
| 2008/0260278 A1 | 10/2008 | Zuo et al. |
| 2011/0085743 A1 | 4/2011 | Lei et al. |
| 2013/0223734 A1 | 8/2013 | Tuzel et al. |
| 2013/0322782 A1 | 12/2013 | Chen et al. |
| 2014/0211859 A1* | 7/2014 | Carmel ................ H04N 19/124 375/240.26 |
| 2014/0301649 A1 | 10/2014 | Zhang et al. |
| 2014/0354826 A1 | 12/2014 | Kolarov |

OTHER PUBLICATIONS

Vitale, Tim, Film Grain, Resolution and Fundamental Film Particles, Apr. 2007, pp. 1-26, version 20.

\* cited by examiner

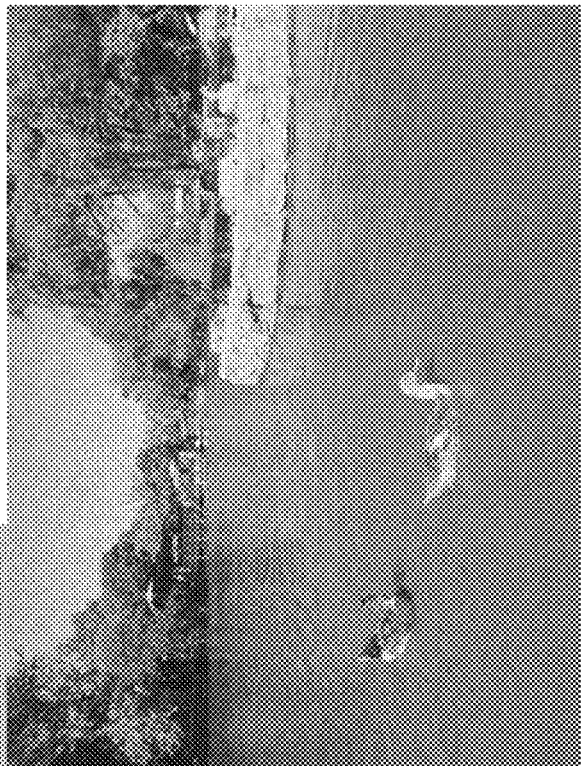

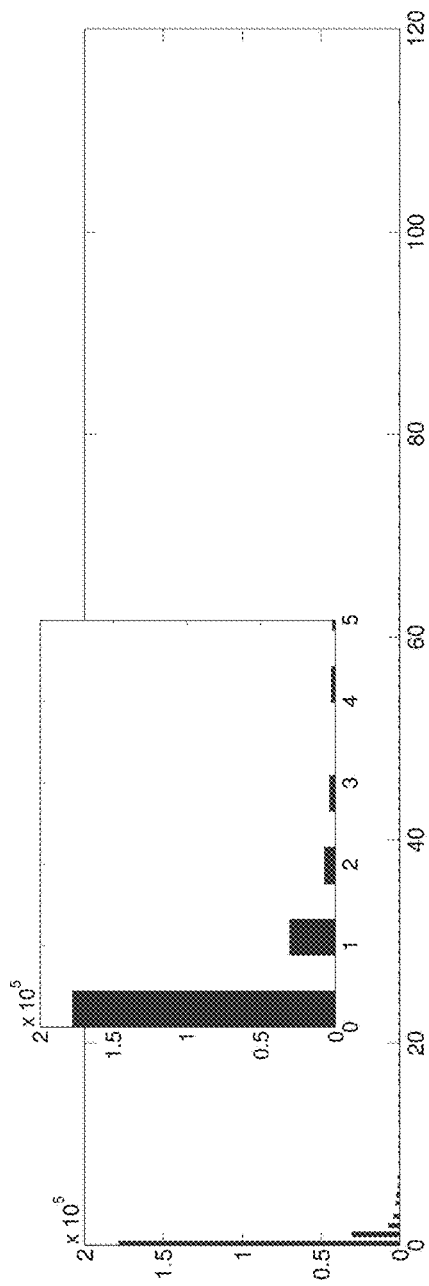
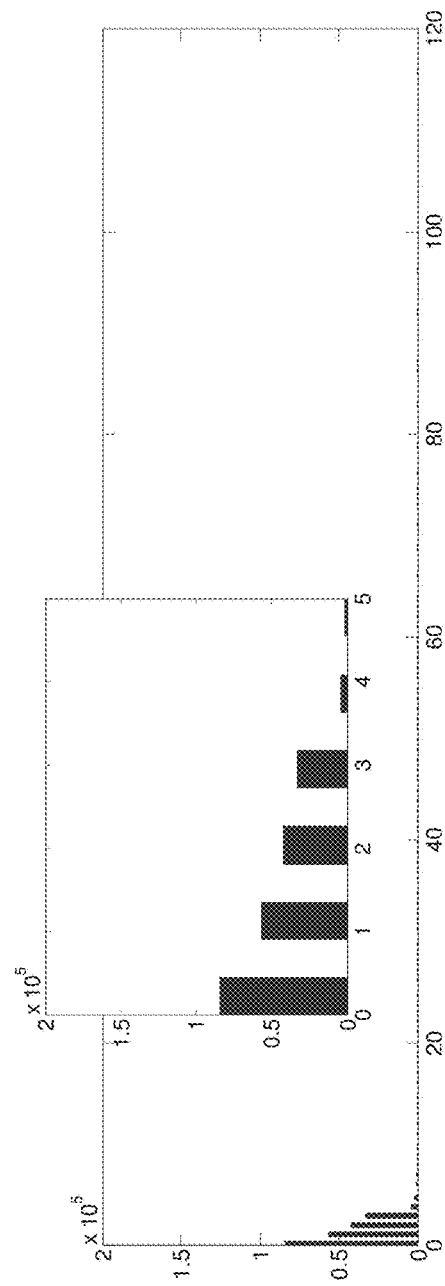

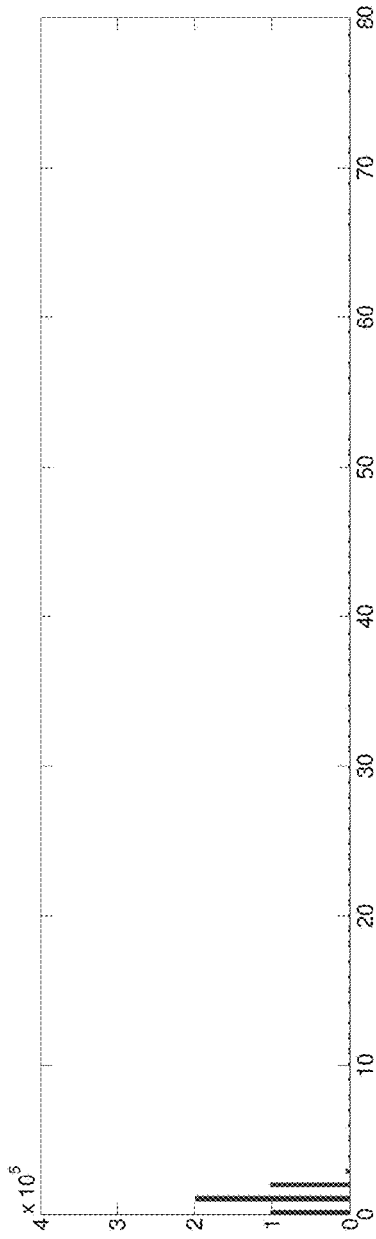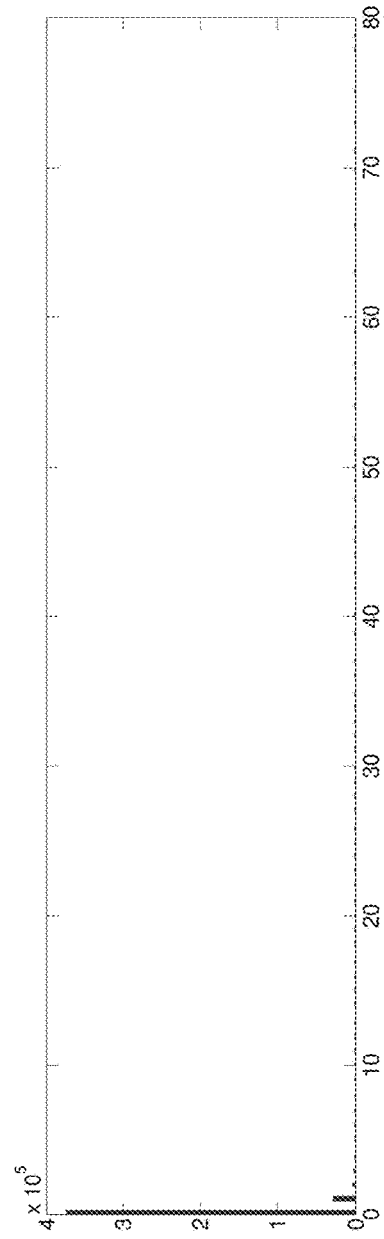

Fig. 9A

| 0 | 1 | 2 |
|---|---|---|
| 3 | - | 4 |
| 5 | 6 | 7 |

Fig. 9B

| 23 | 24 | 124 |
|---|---|---|
| 22 | 123 | 125 |
| 120 | 128 | 130 |

Fig. 9C

| 100 | 99 | 1 |
|---|---|---|
| 101 | - | 2 |
| 3 | 5 | 7 |

METHOD OF CONTROLLING A QUALITY MEASURE AND SYSTEM THEREOF

TECHNICAL FIELD

The presently disclosed subject matter relates, in general, to the field of configuration of a quality measure in a compression quality evaluation system.

BACKGROUND

With the fast development of imaging and video technologies, images and video play a key role as a mechanism of information exchange, transmission or storage nowadays. Image or video compression systems, as well as compression quality evaluation systems, have been widely deployed in many aspects. Due to the wide variety of content types of the input images, it is quite challenging for the compression quality evaluation system to reliably evaluate the compression quality. Sometimes it can be beneficial to use certain features of an input image or frame to configure or control the compression quality evaluation system.

GENERAL DESCRIPTION

In accordance with certain aspects of the presently disclosed subject matter, there is provided a computerized method of controlling a quality measure in a compression quality evaluation system, the method comprising: calculating a grain value indicative of an extent of grain present in an input image, the grain value being calculated based on one or more features characterizing a base image related to the input image; and configuring the quality measure upon a grain criterion being met by the grain value, the quality measure being indicative of perceptual quality of a compressed image compressed from the input image.

In addition to the above features, the method according to this aspect of the presently disclosed subject matter can comprise one or more of features (i) to (xxxix) listed below, in any desired combination or permutation which is technically possible:

(i). the base image is selected from a group comprising: the input image, a difference image between the input image and a filtered version of the input image, and a difference image between the input image and one or more adjacent images.

(ii). the base image is a difference image between the input image and a filtered version of the input image, and the calculating comprises:
  applying a Low-Pass-Filter to the input image giving rise to the filtered version of the input image;
  calculating absolute difference values between corresponding pixels of the input image and the filtered version of the input image giving rise to the difference image; and
  computing the grain value based on one or more features characterizing the difference image.

(iii). the one or more features include a sub set of features indicative of distribution of pixel values in the difference image.

(iv). the Low-Pass-Filter is a 2-D smoothing filter.

(v). the sub set of features are a percentage of the pixel values that lie within a predetermined range.

(vi). the sub set of features are a percentage of the pixel values that lie within a range that is dependent on one or more image characteristics, the image characteristics including maximum, minimum and average brightness of pixels in the input image.

(vii). the calculating further comprises applying a grass detector to the input image and adapting the grain value according to an output of the grass detector.

(viii). the applying includes performing a per pixel classification based on pixel values of the input image, and pooling results of the per pixel classification over the input image to obtain the output of the grass detector.

(ix). the per pixel classification is further based on a variance of values of neighboring pixels.

(x). the per pixel classification is performed on a sub-set of pixels in the input image.

(xi). the adapting includes reducing the grain value in case of the output of the grass detector indicating presence of grass in the input image.

(xii). the calculating of grain value further comprises:
  obtaining a preceding input image;
  computing a frame similarity value between the input image and the preceding input image; and
  adapting the grain value according to the frame similarity value.

(xiii). the computing a frame similarity value comprises calculating absolute difference values between corresponding pixels in the input image and the preceding input image.

(xiv). the computing a frame similarity value comprises evaluating a percentage of corresponding pixels with identical values in the input image and the preceding input image.

(xv). the calculating is based on machine learning, the calculating comprising:
  performing a classification using a grain classifier based on the one or more features to determine the grain value.

(xvi). the grain classifier is pre-trained using a training set of representative marked images.

(xvii). the one or more features includes a sub set of features indicative of distribution of pixel pairs in the base image and a spatially shifted version of the base image.

(xviii). the sub set of features are obtained by calculating auto-correlation coefficients between pixel pairs in the base image and the spatially shifted version of the base image.

(xix). the one or more features includes a sub set of features that are based on a per-block variance value of the base image.

(xx). the one or more features includes a sub set of features that are one or more pixel values of the base image, the base image being the input image.

(xxi). the one or more features include a sub set of features that are based on per-block Discrete cosine transform (DCT) coefficients of the base image, the base image being the input image.

(xxii). the sub set of features are obtained by, for each of one or more blocks of the base image, calculating a ratio between high-frequency and mid-frequency DCT coefficients.

(xxiii). the one or more features include a sub set of features that are based on distribution of per-block pixel value histograms.

(xxiv). the one or more features are extracted separately for different sections of the base image, giving rise to a plurality of per section feature values for each feature.

(xxv). the extracting further comprises, for each feature, pooling the plurality of per section feature values to obtain a combined feature value for the base image.

(xxvi). the different sections are divided such that each section corresponds to a different pixel brightness value interval.

(xxvii). the different sections are divided such that each section corresponds to a different spatial region of the base image.

(xxviii). the pooling comprises applying respective weighting to the plurality of per section feature values, and pooling the weighted plurality of per section feature values to obtain a combined feature value for the base image.

(xxix). the pooling comprises using a maximum feature value of all sections as the combined feature value.

(xxx). the pooling comprises applying an averaging function on the per section feature values to obtain the combined feature value.

(xxxi). the pooling comprises analyzing per section pixel distribution, determining a pooling method based on the analyzing, and pooling the per section feature values to obtain a combined feature value according to the pooling method.

(xxxii). excluding, from the base image, one or more pixels corresponding to outlier or marginal areas based on pixel values, giving rise to a residual image, and wherein the calculating is based on one or more features characterizing the residual image.

(xxxiii). the configuring includes adjusting a quality criterion of the quality measure based on the grain value.

(xxxiv). the quality measure includes an edge loss measure.

(xxxv). the configuring includes adjusting a threshold used to calculate the edge loss measure based on the grain value.

(xxxvi). the threshold is an edge strength threshold used to determine if a pixel is an edge pixel.

(xxxvii). the configuring includes adjusting weighting of the edge loss measure when incorporated into the quality measure according to the grain value.

(xxxviii). the quality measure includes a texture measure.

(xxxix). the configuring includes adjusting weighting of the texture measure when incorporated into the quality measure according to the grain value.

In accordance with certain aspects of the presently disclosed subject matter, there is provided a computerized system of controlling a quality measure in a compression quality evaluation system, the system comprising a processor operatively connected to a memory, the processor configured to: calculate a grain value indicative of an extent of grain present in an input image, the grain value being calculated based on one or more features characterizing a base image related to the input image; and configure the quality measure upon a grain criterion being met by the grain value, the quality measure being indicative of perceptual quality of a compressed image compressed from the input image.

This aspect of the disclosed subject matter can comprise one or more of features (i) to (xxxix) listed above with respect to the method, mutatis mutandis, in any desired combination or permutation which is technically possible.

In accordance with certain aspects of the presently disclosed subject matter, there is provided a non-transitory computer readable storage medium tangibly embodying a program of instructions executable by a computer to control a quality measure in a compression quality evaluation system, comprising the steps of the following: calculating a grain value indicative of an extent of grain present in an input image, the grain value being calculated based on one or more features characterizing a base image related to the input image; and configuring the quality measure upon a grain criterion being met by the grain value, the quality measure being indicative of perceptual quality of a compressed image compressed from the input image.

This aspect of the disclosed subject matter can comprise one or more of features (i) to (xxxix) listed above with respect to the method, mutatis mutandis, in any desired combination or permutation which is technically possible.

BRIEF DESCRIPTION OF THE DRAWINGS

In order to understand the presently disclosed subject matter and to see how it may be carried out in practice, the subject matter will now be described, by way of non-limiting example only, with reference to the accompanying drawings, in which:

FIG. 6A is an example input image without grain, in accordance with certain embodiments of the presently disclosed subject matter;

FIG. 6B is an example input image with grain, in accordance with certain embodiments of the presently disclosed subject matter;

FIG. 7A is an exemplified distribution of the absolute difference values between an input image and a low-pass filtered version of the input image, for an example input image without grain, in accordance with certain embodiments of the presently disclosed subject matter;

FIG. 7B is an exemplified distribution of the absolute difference vales between an input image and a low-pass filtered version of the input image, for an example input image containing grain, in accordance with certain embodiments of the presently disclosed subject matter;

FIG. 8A is an exemplified distribution of the absolute difference vales between an input image and a preceding input image, for a non-static scene, in accordance with certain embodiments of the presently disclosed subject matter;

FIG. 8B is an exemplified distribution of the absolute difference vales between an input image and a preceding input image, for a static scene, in accordance with certain embodiments of the presently disclosed subject matter;

FIG. 9A is an example of a schematic enumeration of the pixels surrounding the pixel at {i, j}, in accordance with certain embodiments of the presently disclosed subject matter;

FIG. 9B is a schematic illustration of the pixel values of the pixels surrounding the pixel at {i, j}, in accordance with certain embodiments of the presently disclosed subject matter; and FIG. 9C is a schematic illustration of the absolute differences values computed for the pixels surrounding the pixel at {i, j}, in accordance with certain embodiments of the presently disclosed subject matter.

DETAILED DESCRIPTION

Figure 1:
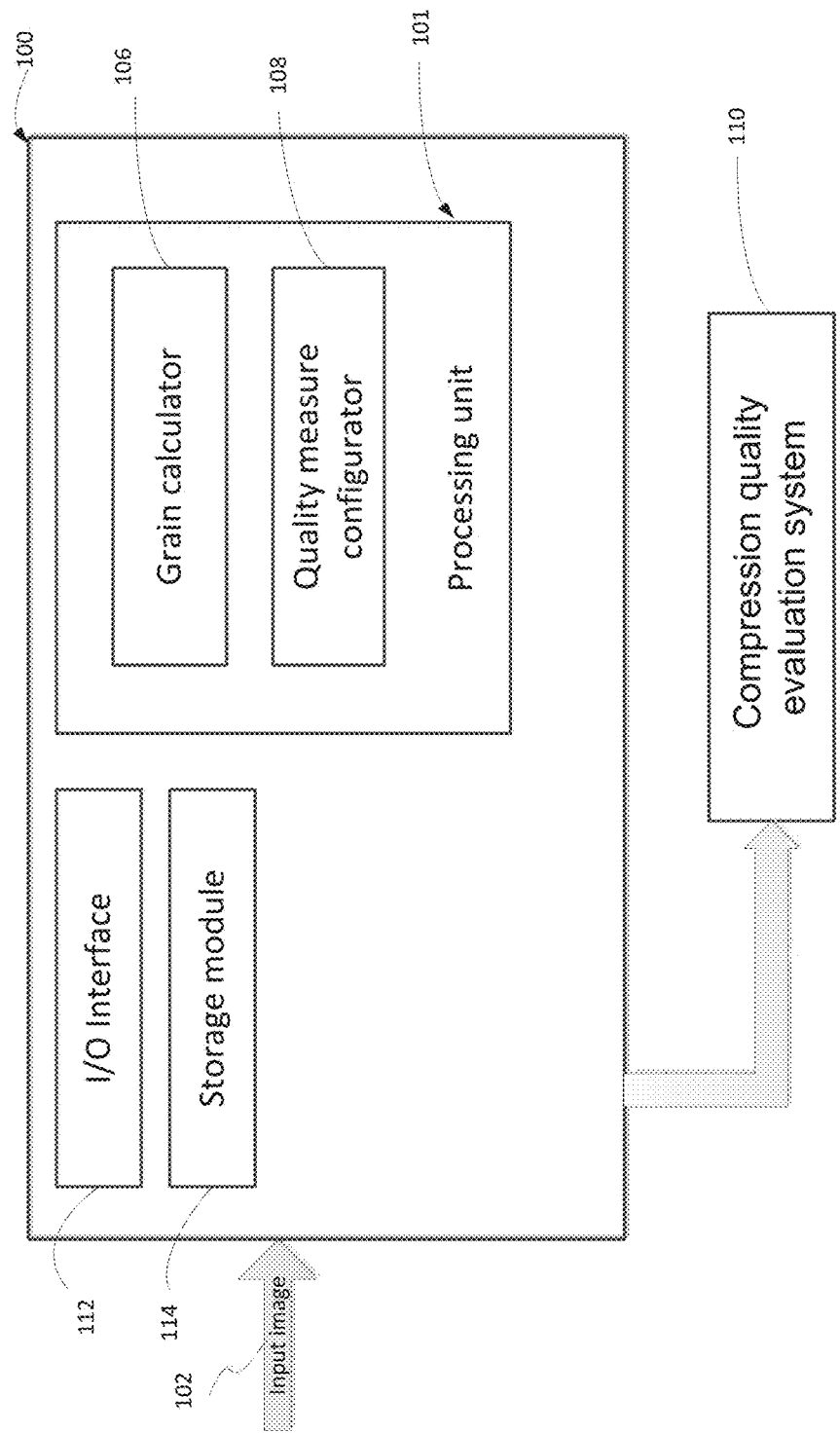
FIG. 1 is a functional block diagram schematically illustrating a system for controlling a quality measure in a compression quality evaluation system in accordance with certain embodiments of the presently disclosed subject matter.

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "controlling", "calculating", "configuring", "computing", "applying", "evaluating", "performing", "obtaining", "adjusting", "adapting", "determining", "pooling", "extracting", "dividing", "using", "classifying" or the like, include actions and/or processes of a computer that manipulate and/or transform data into other data, said data represented as physical quantities, e.g. such as electronic quantities, and/or said data representing the physical objects. The terms "computer", "processor", and "processing unit" should be expansively construed to cover any kind of hardware-based electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein can be performed by a computer specially constructed for the desired purposes or by a general purpose computer specially configured for the desired purpose by a computer program stored in a non-transitory computer readable storage medium.

The terms "non-transitory" and "non-transitory storage medium" are used herein to exclude transitory, propagating signals, but to otherwise include any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination.

In embodiments of the presently disclosed subject matter one or more stages illustrated in the figures may be executed in a different order and/or one or more groups of stages may be executed simultaneously and vice versa.

Bearing this in mind, attention is now drawn to FIG. 1, schematically illustrating a functional block diagram of a system for controlling a quality measure in a compression quality evaluation system in accordance with certain embodiments of the presently disclosed subject matter.

According to certain embodiments, there is provided a system 100 for controlling a quality measure in a compression quality evaluation system based on a grain measure of an input image 102. The input image may be a stand-alone input image, or may be a frame of a sequence of images as in the case of video. The input image is represented by its pixel values, for instance with YUV or RGB pixel values. In one embodiment an input image may comprise luma information represented in a luma plane and chroma information represented in one or more chroma planes. By way of example, in a YUV color model, the luma information can be represented in a Y plane, and the chroma information can be represented in a U plane and a V plane. Without limiting the disclosure in any way, other color models that can be used to encode the images include: Y'UV, YUV, and YCbCr, etc. Further, the chroma planes may be sub-sampled, as is common in image and video compression systems. The system 100 can comprise a processing unit 101 that includes a grain calculator 106 and a quality measure configurator 108. The system 100 can be operatively connected to a compression quality evaluation system 110 for controlling the quality measure used therein, as will be described in detail below.

The processing unit 101 can be configured to execute several functional modules (e.g., the grain calculator 106 and the quality measure configurator 108, etc.) in accordance with computer-readable instructions implemented on a non-transitory computer readable storage medium. Such functional modules are referred to hereinafter as comprised in the processing unit.

According to certain embodiments, the compression quality evaluation system 110 can be configured to evaluate the compression quality of a compressed image as in an image content system (e.g., an image compression system). Alternatively or additionally, it can also evaluate the compression quality of a compressed video sequence, as in a video content system (e.g., a video compression system).

Various quality measures which aim to numerically quantify the perceptual quality of a compressed digital image (or a compressed frame in a compressed video sequence) as compared to an input original image (or original frame in an original video sequence) can be used in the compression quality evaluation system 110. For example, a possible usage of such a quality measure may be to control an image or video recompression system, aiming at introducing a controlled amount of degradation in the recompression process, for example allowing for perceptually lossless recompression.

The compression quality evaluation system 110 may implement any known quality measure. The term "quality measure" or "quality metric" is used herein to relate to a computable quality measure which provides an indication of video content quality. Such a quality measure receives as input a target image or video frame or a sequence of target video frames (e.g., candidate recompressed frames), and optionally also receives as input a corresponding reference image or video frame or a corresponding sequence of reference video frames (e.g., the input frames decoded from the input video bitstream), and uses various quality metrics or quality measures to calculate a quality score for the target frame or target frame sequence.

One example of a quality metric used herein can be a perceptual quality measure. By way of example, a perceptual quality measure can define a target (e.g., a minimal or a maximal) level of perceptual similarity. In other words, in such an example, the quality criterion can set forth a certain level of perceptual similarity, and the recompression operation can be configured to provide a candidate recompressed frame whose visual appearance, relative to the input video frame, is above (or below) the target level of perceptual similarity. In one example the quality criterion can include a requirement that a candidate recompressed frame is perceptually identical (i.e., the quality measure score is above a certain value) to the corresponding input video frame.

Examples of quality measures that can be utilized herein include any of the following: Peak Signal to Noise Ratio (PSNR), Structural SIMilarity index (SSIM), Multi-Scale Structural SIMilarity index (MS-SSIM), Video Quality Metric (VQM), Visual information Fidelity (VIF), MOtion-based Video Integrity Evaluation (MOVIE), Perceptual Video Quality Measure (PVQM), quality measure using one or more of Added Artifactual Edges, texture distortion measure, and a combined quality measure combining inter-frame and intra-frame quality measures, such as described in US patent application publication No. 2014/0211859 published on Jul. 31, 2014, which is incorporated herein in its entirety by reference, in particular, see paragraphs [0132]-[0149] for an example of a pixel-wise intra-frame quality measure and paragraphs [0151]-[0178] for an example of an inter-frame quality measure, as well as paragraphs [0179]-[0242].

According to certain embodiments, the combined quality measure evaluates, for a given input frame, a respective compressed video frame (in some other cases it can be a recompressed video frame) whether the frame overall quality, measured as a combination of the compressed frame's inter-frame and intra-frame relative perceptual quality, meets a desired quality criterion or not. The combined quality measure can be implemented by computing an intra-frame quality score using an intra-frame quality measure that is applied in the pixel-domain of a current input frame and a corresponding current candidate compressed frame. An inter-frame quality score can also be computed by firstly computing a first difference value from the current input frame and a preceding input frame, and a second difference value from a candidate compressed frame and a preceding compressed frame. The inter-frame quality score for the current candidate compressed frame can then be determined based on a comparison between the first and second difference values.

According to certain embodiments, the intra-frame quality score can optionally be associated with one or more of the following intra-wise quality measures: an added artifactual edges measure, a texture distortion measure, a pixel-wise difference measure and an edge loss measure. By way of example, as part of the intra-frame quality score computation, an added artifactual edges measure can be implemented and an added artifactual edges score can be calculated. The added artifactual edges score can be calculated based on quantifying an extent of added artifactual edges along a video encoding coding block boundary of an encoded frame relative to an input video frame. In some cases, the extent of added artifactual edges can be determined according to a behavior of pixel values (e.g., a change of pixel values) across video coding block boundaries in relation to a behavior of pixel values on either side of respective video coding block boundaries.

By way of another example, as part of the intra-frame quality score computation, a texture distortion measure can be implemented and a texture distortion score can be calculated. The texture distortion measure can be based on relations between texture values in an encoded frame and in a corresponding input video frame. Each texture value corresponds to a variance of pixel values within each one of a plurality of predefined pixel groups in the encoded frame and in each respective pixel group in the corresponding input video frame.

By way of further example, as part of the intra-frame quality score computation, a pixel-wise difference measure can be implemented using a pixel-domain quality measure based on a pixel-wise difference between the video frame and the encoded frame.

By way of yet a further example, as part of the intra-frame quality score computation, an edge loss measure can be implemented and an edge loss score can be calculated. For example, the edge loss score computation can include: obtaining an edge map corresponding to a video frame, computing for each edge pixel in the video frame an edge strength score based on a deviation between a value of an edge pixel and one or more pixels in the proximity of the edge pixel, computing for each corresponding pixel in the encoded frame an edge strength score based on a deviation between a value of the corresponding pixel and one or more pixels in the proximity of the corresponding pixel, and the edge loss score is calculated based on a relation among the edge strength score of the edge pixel and the edge strength score of the corresponding pixel.

According to certain embodiments, as part of the inter-frame quality score computation, the first difference value can be calculated based on a pixel-wise difference between an input video frame and a preceding input frame, and the second difference value can be calculated based on a pixel-wise difference between a current encoded frame and a preceding encoded frame encoded from the preceding input frame. Then the inter-frame quality score can be computed based on a comparison of the first difference value and the second difference value, in order to evaluate a temporal consistency of the encoded frame.

Based on the computed intra-frame quality score and inter-frame quality score, an overall quality score for the current candidate compressed frame can be computed. According to some embodiments, such combined quality measure can enable the video encoder to provide a near maximal compression rate for a given input frame while maintaining the overall relative perceptual quality of the respective compressed video frame at a level that meets a desired quality criterion.

Accurate objective perceptual quality evaluation is a challenging problem. One of the many challenges in this field is related to evaluating quality in the presence of grain. Grain originally refers to film grain, or granularity, which originates from the random optical texture of processed photographic film due to the presence of small particles of a metallic silver, or dye clouds, developed from silver halide that have received enough photons. While film grain is a function of such particles (or dye clouds) it is not the same thing as such. It is an optical effect, the magnitude of which (amount of grain) depends on both the film stock and the definition at which it is observed. It can be objectionably noticeable for instance in an over-enlarged developed photograph.

Digital photography does not exhibit film grain, since there is no film for any grain to exist within. Film grain overlay, sometimes referred to as "FGO," is a process in which film emulsion characteristics are overlaid using different levels of opacity onto a digital file. This process adds film noise characteristics, and in videos or subsequent image sequences or videos, adds subtle flicker to the more sterile looking digital medium.

In some cases, the added grain poses a significant challenge for quality evaluation in the context of compression systems for at least two reasons.

First, due to its noise-like character, or high spatial frequency content, grain is often poorly preserved in the compression process. For instance, when using block-based coding/encoding schemes (also termed as block level coding/encoding scheme, or block transform coding/encoding scheme) such as, for example, MPEG-1, MPEG-2, H.261, H.263, MPEG-4 Part2, MPEG-4 part10, AVC, H.264, HEVC, Motion-JPEG, VP8, VP9, VC-1, WebM and ProRes, and in particular when the image or video compression process is an encoding scheme utilizing a Discrete Cosine Transform (DCT), high frequency content can often be attenuated, or even lost, during compression.

The second challenge is related to the fact that while grain has similar physical characteristics to both high frequency texture (for example grass on a football field, or close up of skin) and to noise, it is interpreted differently by the Human Visual System than other textures.

Turning now to FIGS. 6A and 6B, there is shown an example of two versions of an original image. The first image, shown in FIG. 6A, does not contain significant grain. The second, shown in FIG. 6B, has been processed and artificial film grain has been added. As can be seen, the grain has similar features to mosquito noise, but generally temporally varies across subsequent video frames.

Accordingly system 100 is provided to evaluate and quantify the presence of grain in the input image and to configure the quality measure upon the presence of grain, for improved compression or recompression control.

As illustrated in FIG. 1, the system 100 may receive an input image 102 which can be, in some cases, a stand-alone picture or image, or part thereof, as in an image content system. In some other cases, the input image can be at least one frame or one slice of a video sequence as in a video content system. Without limiting the scope of the disclosure in any way, it should be noted that from here onwards the terms "picture", "image" and "frame" are used interchangeably to refer to any one of the following: a picture, an image, a frame of a video sequence or a slice thereof, and a field of an interlaced video frame etc. It is to be noted that the input image 102 can be an original unprocessed image, or in some other cases, it can be a degraded image (e.g., a compressed image) which is encoded from an original image.

According to certain embodiments, the grain calculator 106 can be configured to calculate a grain value indicative of an extent of grain present in the input image 102. In some embodiments the grain value of the input image can be calculated based on at least a portion of the input image indicating the extent of grain present in that portion of the image. The quality measure configurator 108 can configure a quality measure upon a grain criterion being met by the grain value, as will be described in further detail below with reference to FIG. 3. Alternatively, the quality measure configurator 108 can provide a configuration instruction for the compression quality evaluation system 110 to configure the quality measure used therein. As aforementioned, the quality measure is used in the compression quality evaluation system 110 as an indication of perceptual quality of a compressed image which is compressed from the input image 102.

The compression quality evaluation system 110 is operatively connected with the system 100. It can receive configuration instructions therefrom to configure the quality measure used in the quality evaluation, or alternatively the quality measure can be configured directly by the system 100. According to certain embodiments, the compression quality evaluation system 110 can be further operatively connected to an image or video compression system which compresses or recompresses the input images based on the evaluation result.

According to certain embodiments, the functionality of the compression quality evaluation system 110, or at least part thereof, can be integrated within the system 100.

By way of example, the system 100 can further comprise the compression quality evaluation system 110, and accordingly, instead of just configuring the quality measure in the compression quality evaluation system 110 or providing a configuration instruction to the compression quality evaluation system 110 to configure the quality measure, the system 100 can further evaluate the compression quality of the compressed image in accordance with the configured quality measure.

According to certain embodiments, the system 100 can further comprise an I/O interface 112 and a storage module 114 operatively coupled to the other functional components described above. According to certain embodiments, the I/O interface 112 can be configured to obtain an input image 102 and provide a configuration instruction to the compression quality evaluation system 110. The storage module 114 comprises a non-transitory computer readable storage medium. For instance, the storage module can include a buffer that holds one or more input images or frames. In another example, the buffer may also hold the compressed images or frames compressed from the input images. In yet another example, in case of the input being a plurality of frames of a video sequence, the buffer may also hold preceding frames of the current frame which can be used to calculate an inter-frame quality measure having a temporal component.

Those versed in the art will readily appreciate that the teachings of the presently disclosed subject matter are not bound by the system illustrated in FIG. 1 and the above exemplified implementations. Equivalent and/or modified functionality can be consolidated or divided in another manner and can be implemented in any appropriate combination of software with firmware and/or hardware and executed on a suitable device.

The system 100 can be a standalone network entity, or integrated, fully or partly, with other network entities. Those skilled in the art will also readily appreciate that the data repositories can be consolidated or divided in other manner, and can be shared with other systems or be provided by other systems, including third party equipment.

Figure 3:
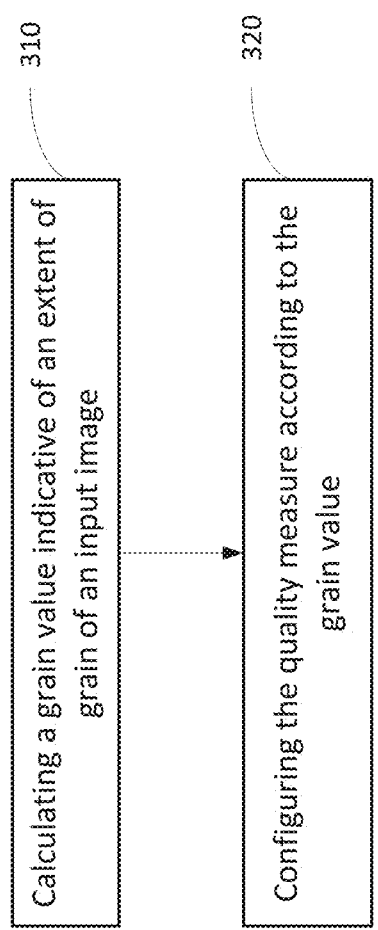
FIG. 3 is a generalized flowchart of controlling a quality measure in a compression quality evaluation system in accordance with certain embodiments of the presently disclosed subject matter.

While not necessarily so, the process of operation of system 100 can correspond to some or all of the stages of the methods described with respect to FIG. 3. Likewise, the methods described with respect to FIG. 3 and their possible implementations can be implemented by system 100. It is therefore noted that embodiments discussed in relation to the methods described with respect to FIG. 3 can also be implemented, mutatis mutandis as various embodiments of the system 100, and vice versa.

Figure 2:
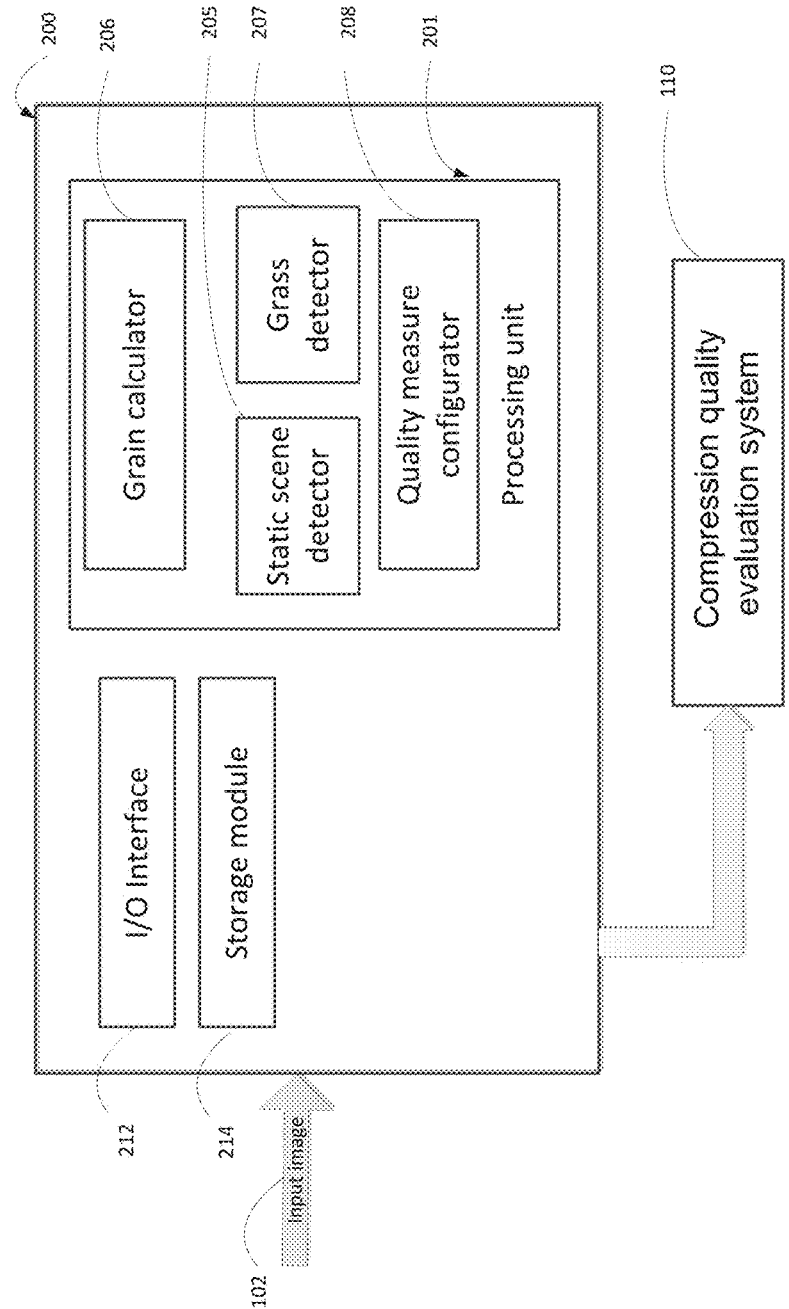
FIG. 2 is a functional block diagram schematically illustrating a second system for controlling a quality measure in a compression quality evaluation system in accordance with certain embodiments of the presently disclosed subject matter.

Turning now to FIG. 2, there is schematically illustrated a functional block diagram of a second system for controlling a quality measure in a compression quality evaluation system in accordance with certain embodiments of the presently disclosed subject matter.

According to certain embodiments, there is provided a second system 200 for controlling a quality measure in a compression quality evaluation system based on a grain measure of an input image 102. The system 200 can comprise a processing unit 201 that includes a grain calculator 206 and a quality measure configurator 208. The system 200 can be operatively connected to a compression quality evaluation system 110 for controlling the quality measure used therein. The functionality of the compression quality evaluation system 110 is described above with reference to FIG. 1. According to certain embodiments, the system 200 can further comprise a grass detector 207 and/or a static scene detector 205.

The processing unit 201 can be configured to execute several functional modules (e.g., the grain calculator 206, the static scene detector 205, the grass detector 207, and the quality measure configurator 208, etc.) in accordance with computer-readable instructions implemented on a non-transitory computer readable storage medium. Such functional modules are referred to hereinafter as comprised in the processing unit.

Presence of grass in the video image may cause a false grain indication. As the texture of grain and grass have similarities, it may be desirable in certain embodiments of the presently disclosed subject matter, to incorporate a grass detector 207, as will be described in further detail below with reference to FIG. 4.

The impact of grain on perceptual quality may also be affected by the nature of a video scene. In scenes with very little change between adjacent frames, such as in the case of Cel-Animation, there is more need to maintain fine detail, including grain detail, for preserving perceptual quality, when compared to regular non-static scenes. In order to identify static scenes it may be desirable in certain embodiments of the presently disclosed subject matter, to incorporate a static scene detector 205, as will be described in further detail below with reference to FIG. 5B.

As illustrated in FIG. 2, the system 200 may receive the input image 102 which, as aforementioned, can be a standalone image or at least one frame of a video sequence. According to certain embodiments, the grain calculator 206 can be configured to calculate a grain value indicative of presence and/or extent of grain in the input image 102. In some embodiments the grain value of the input image can be calculated based on at least a portion of the input image indicating the presence and extent of grain of that portion of the image. The quality measure configurator 208 can configure a quality measure upon a grain criterion being met by the grain value, as will be described in further detail below with reference to FIG. 3. Alternatively, the quality measure configurator 208 can provide a configuration instruction for the compression quality evaluation system 110 to configure the quality measure used therein. As aforementioned, the quality measure is used in the compression quality evaluation system 110 as an indication of perceptual quality of a compressed image which is compressed from the input image.

The compression quality evaluation system 110 is operatively connected with the system 200. It can receive configuration instructions therefrom to configure the quality measure used in the quality evaluation, or alternatively the quality measure can be configured directly by the system 200. According to certain embodiments, the compression quality evaluation system 110 can be further operatively connected to an image or video compression system which compresses or recompresses the input images based on the evaluation result.

According to certain embodiments, the functionality of the compression quality evaluation system 110, or at least part thereof, can be integrated within the system 200. By way of example, the system 200 can further comprise the compression quality evaluation system 110, and accordingly, instead of just configuring the quality measure in the compression quality evaluation system 110 or providing a configuration instruction to the compression quality evaluation system 110 to configure the quality measure, the system 200 can further evaluate the compression quality of the compressed image in accordance with the configured quality measure.

According to certain embodiments, the system 200 can further comprise an I/O interface 212 and a storage module 214 operatively coupled to the other functional components described above. According to certain embodiments, the I/O interface 212 can be configured to obtain an input image and provide a configuration instruction to the compression quality evaluation system 110. The storage module 214 comprises a non-transitory computer readable storage medium. For instance, the storage module can include a buffer that holds one or more input images or frames. In another example, the buffer may also hold the compressed images or frames compressed from the input images. In yet another example, in case of the input being a plurality of frames of a video sequence, the buffer may also hold preceding frames of the current frame which can be used to calculate an inter-frame quality measure having a temporal component. In certain embodiments, the preceding frame or frames may be used to determine whether the scene is static, and to this end can be provided as input to a static scene detector 205, as will be described in further detail below with reference to FIG. 5B.

Those versed in the art will readily appreciate that the teachings of the presently disclosed subject matter are not bound by the system illustrated in FIG. 2 and the above exemplified implementations. Equivalent and/or modified functionality can be consolidated or divided in another manner and can be implemented in any appropriate combination of software with firmware and/or hardware and executed on a suitable device.

The system 200 can be a standalone network entity, or integrated, fully or partly, with other network entities. Those skilled in the art will also readily appreciate that the data repositories can be consolidated or divided in other manner, and can be shared with other systems or be provided by other systems, including third party equipment.

While not necessarily so, the process of operation of system 200 can correspond to some or all of the stages of the methods described with respect to FIGS. 3, 4, 5A and 5B. Likewise, the methods described with respect to FIGS. 3, 4, 5A and 5B and their possible implementations can be implemented by system 200. It is therefore noted that embodiments discussed in relation to the methods described with respect to FIGS. 3, 4, 5A and 5B can also be implemented, mutatis mutandis as various embodiments of the system 200, and vice versa.

Turning now to FIG. 3, there is shown a generalized flowchart of controlling a quality measure in a compression quality evaluation system in accordance with certain embodiments of the presently disclosed subject matter.

According to certain embodiments, the controlling process of the quality measure is done based on a grain measure, as described in detail as follows. A grain value indicative of an extent of presence of grain of an input image can be calculated (310) (e.g., by the grain calculator 106 in FIG. 1). According to certain embodiments, the calculation of the grain value can be based on at least a portion of the input image. The portion can be, for example, a certain percentage of the input image, a region at a predetermined location of the input image (e.g., the center of the image), etc. In one embodiment, the calculation can be performed based on the entire input image.

According to certain embodiments, the grain value can be calculated based on one or more features characterizing a base image related to the input image. A base image is an image based on which the grain value can be calculated. It can be, in some cases, the input image itself, and in some other cases it can be an image derived from the input image. By way of example, the base image can be selected from a group comprising: the input image, a difference image between the input image and a filtered version of the input image, and a difference image between the input image and one or more adjacent images.

Since perceived grain may differ in dark and light areas of an image, according to certain embodiments, some pixels from at least a portion of the input image, as aforementioned, can be excluded from the calculation of the grain value upon a condition being met. The condition can be that, for instance, these pixels have brightness values that are above a high brightness threshold. In yet another example the condition can be that, for instance, these pixels have brightness values that are below a low brightness threshold. In yet other embodiments, all pixels in a certain area of the at least a portion of input image may be excluded from the calculation of the grain value upon a condition being met. The condition can be that, for instance, the brightest pixel in such area is above, or below, a brightness threshold. In yet another instance, the condition can be that, for instance, the average pixel brightness in such area is above, or below, a brightness threshold.

Further details on certain embodiments of the calculation of the grain value will be described below with reference to FIG. 5A.

Next, there are described exemplified configurations of the quality measure upon a grain criterion being met by the grain value with reference to block 320 of FIG. 3.

According to examples of the presently disclosed subject matter, as part of the quality score computation and quality evaluation, an edge loss measure can be implemented and an edge loss score can be calculated. The edge loss score can be indicative of how much of the sharpness or crispness of edges in the input image is retained in the degraded or compressed image. For example the edge loss score may be in the range of 0 to 1, with 0 indicating severe loss of edge sharpness or smearing of edges, and 1 indicating edges are perfectly preserved in the compressed image. According to examples of the presently disclosed subject matter, the edge loss score computation can include obtaining an edge map corresponding to a current input frame (e.g., the input image) and computing the edge loss score based on the edge map corresponding to the current input frame. For example, the edge loss score computation can include: obtaining an edge map corresponding to the current input frame, computing for each edge pixel in the current input frame an edge strength score (i.e., a score that indicates the amplitude of the edge) based on a deviation between a value of an edge pixel and one or more pixels in the proximity of the edge pixel, computing for each corresponding pixel in a candidate compressed frame (i.e., a frame compressed from the current input frame) an edge strength score based on a deviation between a value of the corresponding pixel and one or more pixels in the proximity of the corresponding pixel, and calculating the edge loss score based on a relation among the edge strength score of the edge pixel and the edge strength score of the corresponding pixel.

According to further examples of the presently disclosed subject matter, the edge loss score computation can include obtaining an edge map corresponding to the current input frame and obtaining an edge map corresponding to the candidate compressed frame. For example, the edge loss score computation can include: obtaining an edge map corresponding to the current input frame, obtaining an edge map corresponding to the candidate compressed frame and calculating an edge loss score based on a loss of edge pixels according to a difference between the edge map corresponding to the current input frame and the edge map corresponding to the candidate compressed frame.

Further details with respect to the edge loss measure are now provided by way of example. According to some examples of the presently disclosed subject matter, as with the other quality measures described herein, the frame pair (including the current input frame and the candidate compressed frame) can be partitioned into a plurality of tile pairs, and the edge loss measure can be applied to the tile pairs, and edge loss scores for the tiles that are associated with a given frame can be pooled together.

According to certain embodiments, the frame or image can be partitioned into multiple tiles. The size of a tile can be determined such that the image is divided into a predetermined number of tiles, or such that tiles have a predetermined dimension which may or may not be dependent on the image dimensions. The tile size may also be adapted such that the tile grid can be aligned with coding block boundaries. Tile dimensions can be some multiple of coding block size, such as, e.g., 64×64, 80×80, 128×128, or 256×256, or 160×128, etc. In some cases the partitioned tiles may not completely cover the image and there may be some regions which remain unpartitioned, e.g., on the margins of the image. Further by way of example, the tiles can be square but can also have other shapes or forms. Still further by way of example, tile size can be adapted for instance according to frame resolution, such that, for example, smaller tiles can be used for smaller frames. Yet further by way of example, tile size can be calculated according to the number of tiles that would fit into a given frame, with possible rounding to a whole multiple of coding block size. Yet further by way of example, tile size can be determined taking into consideration the characteristic of a per tile quality measure that is used for calculating the quality score for each tile pair.

According to examples of the presently disclosed subject matter, the edge loss measure can include a computation of a binary edge map for each current input frame or for each tile of a current input frame. Further by way of example, the edge map computation can be implemented as a preliminary, pre-processing stage. Still further by way of example, the binary edge map is generated by providing a value of 1 in the edge map for an edge pixel. Yet further by way of example, an edge detection algorithm such as Canny edge detection, Sobel edge detection, log-Laplacian edge detection, Prewitt edge detection, Roberts edge detection or any other edge detection algorithm can be used.

According to examples of the presently disclosed subject matter, in addition to providing in the edge map a binary indication for an edge pixel, for each edge pixel the edge 'direction' (ED) can be determined. Further by way of example, determining a direction of an edge pixel can include the following: assuming an edge at location $\{i, j\}$, calculating an absolute difference between the pixel value at $\{i, j\}$ and each of the surrounding pixels (e.g., eight surrounding pixels), comparing the absolute differences, and setting $ED_{org}(i, j)$ according to a location of the pixel that produced the largest absolute difference with the pixel at $\{i, j\}$. An example of a schematic enumeration of positions of the pixels surrounding the pixel at $\{i, j\}$ is illustrated in FIG. 9A, which in combination with the schematic illustration of the respective pixel values (edge pixel is bolded) in FIG. 9B and corresponding absolute differences values (maximum value is bolded) in FIG. 9C demonstrate the case for a diagonal edge, where $ED_{org}(i, j)=3$.

According to examples of the presently disclosed subject matter, in one implementation of the edge loss measure computation, in order to calculate the edge loss score (or ELF), the following data can be obtained:

$F_{cmp}$: The current candidate compressed frame/tile;
$F_{org}$: The current input frame/tile;
$EM_{org}$: A binary edge map corresponding to $F_{org}$. Pixel $\{i, j\}$ is an edge pixel,
if $EM_{org}(i, j)>0$.
$ED_{org}$: The "direction" of each edge point, indicated by values in the range 0-7 representing the pixels surrounding the respective edge pixel.

Using the above, for each frame/tile an edge loss score can be calculated. The edge loss score can be used as an indication of an extent (e.g., a percent) of the edge loss among edge pixels. Edge loss can be defined and can be calculated using the following algorithm:

set $N_e=0$; $N_{elf}=0$;

$N_e$ denotes the number of edge pixels in the frame/tile, and $N_{elf}$ indicates the extent of edge data that is preserved in the corresponding compressed image in the pixels corresponding to the edge pixels.

Further, to avoid inaccuracy in the edge measure, it may be desired that false edges which may be related to noise or grain rather than actual edges in the image, may be excluded from the edge loss calculation. Therefore, in one possible embodiment of the presently disclosed subject matter, the edge strength may be calculated at each edge, as indicated by an edge map. For example edge strength may be calculated as follows:

Calculate the edge absolute difference (EAD) value, where the absolute difference between the edge pixel (the value of the pixel in the tile/frame) and the value of the pixel (in the tile/frame) indicated by the corresponding value in $ED_{org}$ in the current input frame/tile to obtain $EAD_{org}(i, j)$.

In an example according to the pixels block shown in FIGS. 9A-9C, the application of the above algorithm step would translate to:

$EAD_{org}(i,j)=|F_{org}(i,j)-F_{org}(i,j-1))|=101;$

Next, the edge absolute difference value, representative of the edge strength, may be compared to an edge strength threshold which can be used to determine if a pixel is a true edge pixel. This edge strength threshold may be adapted according to the grain measure as described above. In the presence of grain the threshold may be raised, so that false edges resulting from the grain do not affect accuracy of the edge loss measure.

In an example of edge loss measure implementation the edge loss may be further calculated as follows:

For each pixel in the evaluated frame/tile, if it is an edge pixel, and if the edge strength exceeds the edge strength threshold:

set $N_e=N_e+1$;

calculate the edge strength in the compressed image;
calculate the edge absolute difference value in the compressed image, as the absolute difference between the pixel in the compressed frame corresponding to the edge pixel in the input frame and the value of the pixel in the compressed frame indicated by the value in $ED_{org}$ for the corresponding pixel in the input frame, to obtain $EAD_{cmp}(i,j)$ In an example according to the pixels block shown in FIGS. 9A-9C, the application of the above algorithm step would translate to:

$EAD_{cmp}(i,j)=|F_{cmp}(i,j)-F_{cmp})(i,j-1))|.$

Then $N_{elf}$ is updated according to the values $ED_{org}$, $ED_{cmp}$ and the relation between them.

According to a further example of the presently disclosed subject matter $N_{elf}$ may be increased by 1 when $EAD_{cmp}(i,j) \le \frac{1}{2}*EAD_{org}(i,j)$ In yet another example, $N_{elf}$ may be updated in a manner that is dependent on the edge strength values in original and compressed images, and/or on the relation between them. In yet further examples the update of $N_{elf}$ at edge pixels may also depend on other image characteristics such as grain, brightness level of edge pixels and/or surrounding pixels, spatial characteristics of the image, etc.

The edge loss measure may be calculated based on a relation between $N_e$ and $N_{elf}$ after processing the edge pixels of the tile/frame. For example: If $N_e$ is increased by 1 at each edge pixel and $N_{elf}$ is increased by a value in the range of 0-1, where 0 indicates poor edge preservation at this pixel, and 1 indicates perfect edge preservation at this pixel, then the edge loss measure over the tile/frame may be calculated as: 1−(Nelf/Ne), where an edge loss measure of 0 indicates very poor edge preservation in the compressed image, and an edge loss measure of 1 indicates perfect edge preservation in the compressed image.

According to certain embodiments of the presently disclosed subject matter, configuring the quality measure can include configuring a texture component of a quality measure. An exemplified illustration of the texture measure is described in US patent application publication No. 2014/0211859 published on Jul. 31, 2014, which is incorporated herein in its entirety by reference, in particular, see paragraphs [0209]-[0222] for an example of a texture measure or texture distortion measure.

It is to be noted that the texture measure is only one kind of quality measure that can be used to evaluate the overall image degradation in the compression quality evaluation system 110, thus it is only one kind of quality measure that can be configured by using the grain value. Other suitable quality measures, such as a local similarity measure, a measure of Added Artifactual Edges, or a combined quality measure combining an inter-frame and intra-frame quality measures, as described above, can be used either separately or in combination thereof, to be configured by using the grain value.

In quality measures, such as but not limited to those mentioned above, it is common to have multiple quality components that are incorporated into a single per frame quality measure. This incorporation or pooling is often performed by perceptually driven weights applied in weighted arithmetic or geometric averaging. For such quality measures the configuring may refer to adapting the weights used for the weighted arithmetic or geometric averaging. For instance, it may be determined in the presence of grain to change the weight of a texture component, e.g., giving less emphasis to texture deterioration for compressed frames. In another example, the weight of an edge loss measure may be adapted so that other score components will become more dominant in the frame quality measure in the presence of grain.

It is to be noted that the above described different configuration schemes are illustrated for exemplified purposes only and should not be construed to limit the disclosure in any way. Other suitable ways to configure a quality measure upon the grain criterion being met by a grain value of the image can be applied in addition or in lieu of the above.

Figure 4:
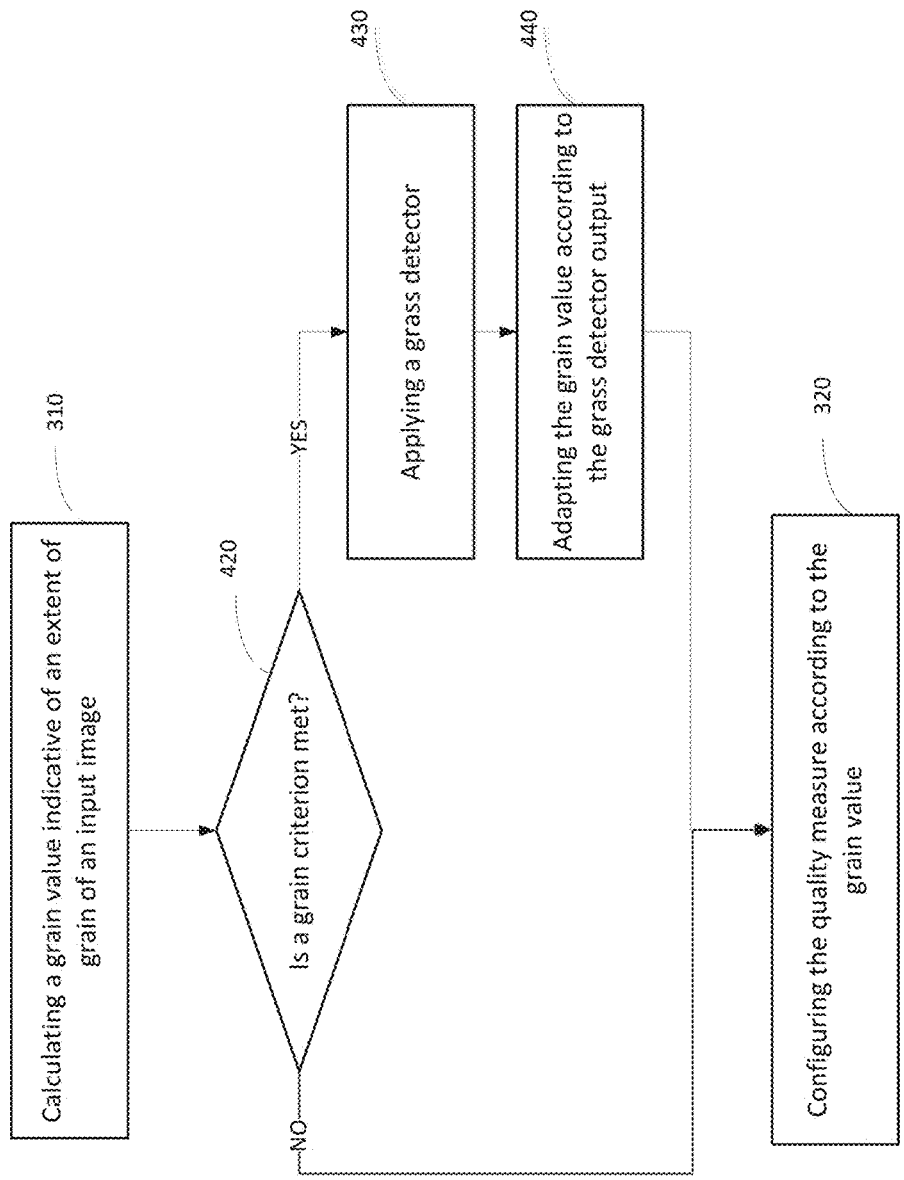
FIG. 4 is a generalized flowchart of controlling a quality measure in a second compression quality evaluation system in accordance with certain embodiments of the presently disclosed subject matter.

Turning now to FIG. 4, there is shown a generalized flowchart of controlling a quality measure in a compression quality evaluation system in accordance with certain embodiments of the presently disclosed subject matter. In this embodiment, calculation of the grain value (310) is followed by checking whether a grain criterion is met by this value (420). If so, a grass detector (430) can also be applied to at least a portion of the input image to determine whether the input image contains grass, which may affect the grain measure, causing grain measure to indicate presence of grain where there is none, due to some similarities in spatio-temporal characteristics of grain and grass, particularly during camera motion. The grass detector can be implemented in many ways. One possible implementation is to perform a per pixel classification based on pixel values of the input image. The pixel values can be classified into grass and non-grass using a pre-trained classifier. For instance, and without limitation, a cascade classifier, such as an AdaBoost classifier may be used. The classifier would be trained on data/information corresponding to grass and non-grass pixels or pixel groups. In one example of the presently disclosed subject matter, the information provided to the per-pixel classifier may include the pixel value, such as its R,G,B or Y,U,V, or Y,Cb,Cr, components. In another example the information may further include the value of the standard deviation or the variance of the neighboring pixel values. For instance, defining an area of 4×4, one input to the classifier may be the mean of the square difference between each neighboring pixel value in the 4×4 area, and the mean of these neighboring pixel values.

According to examples of the presently disclosed subject matter, the per pixel classification can be performed on a sub-set of pixels in the input image. By way of example, the grass detector may be applied to sub-sampled pixel data. For instance, grass-detection may be performed only once per 2×2 or per 4×4 input pixels so that the per pixel classification may be performed on sub-set of pixels (1,1), (1,5), ... (1,N), (5,1),(5,5), etc.

Following grass classification per pixel, the grass detector combines the per pixel classification results, pooling them into a single grass detector output, to determine if grass is present in the at least a portion of the image.

Having performed grass detection the grain value may be adapted according to the grass detector output (440). For example, in case of output of the grass detector indicating presence (or significant presence) of grass in the input image, the grain value may be reduced to avoid false indication of grain due to the presence of grass. The quality measure can be then configured (320) according to the adapted grain value, similarly as described above with reference to FIG. 3.

Figure 5A:
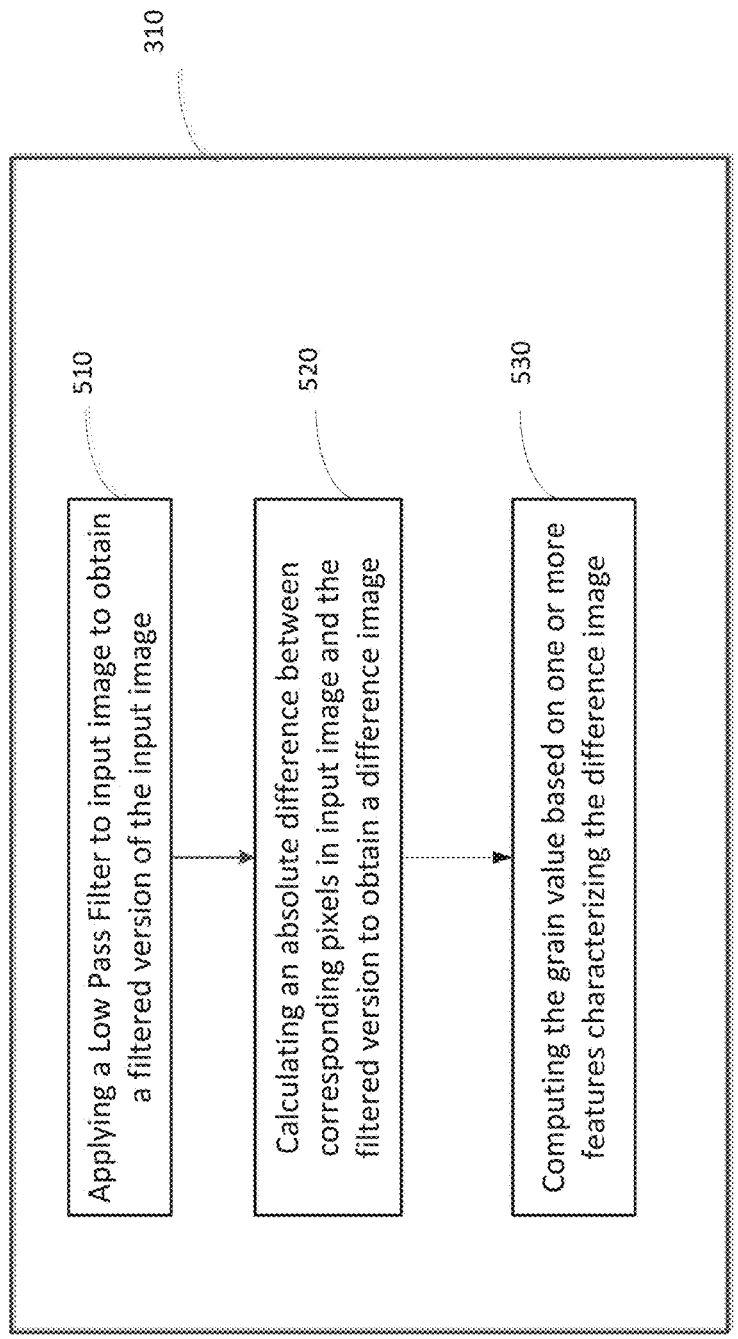
FIG. 5A is a generalized flowchart of the calculation of the grain value in accordance with certain embodiments of the presently disclosed subject matter.

Turning now to FIG. 5A, there is shown a generalized flowchart of calculating the grain value in accordance with certain embodiments of the presently disclosed subject matter.

As aforementioned, the grain value can be calculated based on one or more features characterizing a base image related to the input image. According to certain embodiments, the base image can be a difference image between the input image and a filtered version of the input image. By way of example, calculation of the grain value (310) can include the following steps, as illustrated in FIG. 5A:

i) Applying (510) a digital Low-Pass-Filter (also referred as low pass filter or LPF) to the input image giving rise to a filtered version of the input image. The filtered image is a smoother version of the input image which can be denoted as image_LPF or LPF image. Examples of such a low-pass-filter include, but are not limited to, a 2-D median or mean filter or a 2-D smoothing filter such as Gaussian smoothing filter.

ii) Calculating (520) an absolute difference between corresponding pixels of the input image and the filtered version of the input image giving rise to the difference image which is denoted as diff_image. Corresponding pixels may refer to co-located pixels, or may further include adapting for possible shifts created by the low pass filter.

iii) Computing the grain value (530) based on one or more features characterizing the difference image. In certain embodiments, the one or more features can include a sub set of features indicative of distribution of pixel values in the difference image. By way of example, the sub set of features are a percentage of the pixel values of diff_image that lie within a predetermined range. For images with grain, the low pass filter is expected to remove at least some of the grain, so that the diff_image contains much of the grain energy. In an image with very little grain, diff_image will have pixel values equal to zero, and non-zero values will be distributed between different numerical values, for example locations where edges are blurred will result in corresponding non-zero pixels in the $diff_{13}$ image. An exemplified illustration of the histogram of the pixel values in the diff_image corresponding to a no-grain input is provided in FIG. 7A. Note the zoom in to the bins representing the values 0-5. On the other hand, for images which contain significant grain, there will be less non-zero values in the diff_image, as the low pass filter will have removed much of the grain energy. Thus it is expected that a significant number of the values in the difff_image will be in the range 1-N, where N is larger than 1 and is dependent on both the extent of the grain and the selection of the low pass filter. For example, and without limitation, N may be equal to 5. An exemplified illustration of the histogram of the pixel values in the diff_image corresponding to a grainy input is provided in FIG. 7B. Note again the zoom in to the bins representing the values 0-5.

In one embodiment of the presently disclosed subject matter, the grain value may be calculated based on features such as, e.g., a ratio between the number of pixels in diff_image that are below or equal to a first threshold, for example 0, and the number of pixels in diff_image that are above this first threshold but below or equal to a second, higher threshold, for example 5. In another embodiment of the presently disclosed subject matter, the grain value may be set based on features such as, e.g., a percentage of pixel values in diff_image that lie within a pre-determined value range. In yet another embodiment, the grain value may be set based on features such as, e.g., a percentage of pixel values in diff_image that lie within a pre-determined value range that is dependent on one or more image characteristics. The image characteristics can include maximum, minimum and average brightness of pixels in the input image. By way of example, the grain value may be set based on other properties of the histogram of the values of pixels in diff_image, and these properties may be adapted according to characteristics of the input image such as, by way of non-limiting examples, the input image pixel values, or any of the maximum, minimum or average brightness of pixels in the input image, or presence of grass in the input image, presence of faces in the input image etc.

Figure 5B:
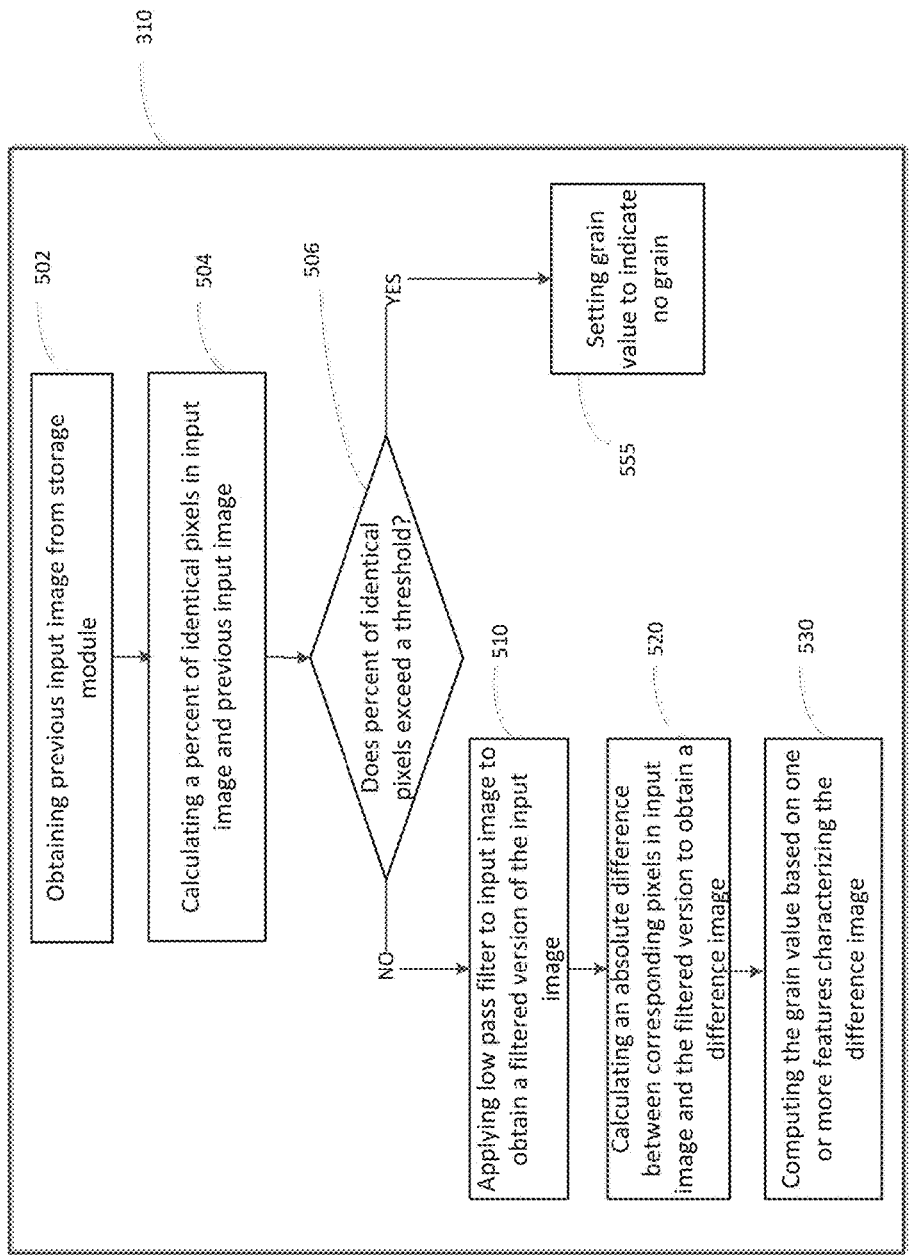
FIG. 5B is a generalized flowchart of the calculation of the grain value, using also a previous input frame, in accordance with certain embodiments of the presently disclosed subject matter.

Turning now to FIG. 5B, there is shown another generalized flowchart of calculating the grain value in accordance with certain embodiments of the presently disclosed subject matter. As detailed above, the impact of grain on perceptual quality may also be affected by the nature of a video scene. In scenes with very little change between adjacent frames, such as in the case of Cel-Animation, the grain is perceived as actual texture and therefore in such cases it is not wished to configure the quality measure according to presence of grain. Thus, in order to identify static scenes, it may be desirable in certain embodiments of the presently disclosed subject matter, to incorporate static scene detection which will over-ride the grain indication and thus avoid undesired configuration of the quality measure. One example of a method for identifying static scenes can include the following steps, as illustrated in FIG. 5B:

i) Obtain (502) a previous input image (also termed as preceding input image) from the storage module 214.

ii) Calculate (504) a frame similarity value between the input image and the preceding input image. In some embodiments, the calculation of the frame similarity value can comprise calculating absolute difference values between corresponding pixels in the input image and the preceding input image. In certain embodiments, the frame similarity value may be calculated, for example, as the percentage of identical pixels in the current input image and the obtained previous input image. In yet another embodiment it is possible to calculate this difference on a motion compensated image, as known to those versed in the art.

iii) Evaluate (506) whether the percent of identical pixels meets a criterion, such as exceeding a threshold.

If the criterion is met—set (555) the grain value to indicate 'no-grain'.

Otherwise—calculate the grain value as described above in reference to blocks 510-530 in FIG. 5A. In some embodiments the first and second thresholds used in step 530 may be adapted according to the percent of identical pixels calculated in block 504.

Turning now to FIG. 8 there are provided exemplified histograms of the difference values between input image and preceding image for the case of a non-static scene in FIG. 8A, and for the case of a static scene in FIG. 8B. Note that, as demonstrated here, the percent of zero difference values is much higher in the case of a static scene. The static scene detector described above is but one usage of this histogram of difference values, while other embodiments may use different histogram characteristics to calculate a frame similarity score leading to a classification of a frame as belonging to a static scene. Further embodiments may also use multiple frames or images for calculating a frame similarity measure leading to a decision whether the scene is static. Yet further embodiments may use the histogram of difference values between the input image and the preceding input image, or images, to configure the calculation of the grain value, rather than overriding it as in the example described above.

It is to be noted that the above described distributions with reference to FIG. 7 and FIG. 8 which are based on experiment results, are illustrated for exemplified purposes only and should not be construed to limit the disclosure in any way.

According to yet other embodiments of the presently disclosed subject matter, the calculation of the grain value (310) as described with respect to FIG. 3 can be based on Machine Learning (ML). In certain embodiments, the grain value can be calculated (e.g., by the grain calculator 106 or 206) by performing a classification using a grain classifier based on one or more features to determine the grain value. According to certain embodiments, the grain classifier (not illustrated in the figures) in some cases can be implemented as an integrated component of the grain calculator 106 or 206, or alternatively, it can be operatively connected with the grain calculator 106 or 206. As aforementioned, the one or more features are features characterizing a base image related to the input image. The grain classifier can be, by way of example, an Adaboost classifier, which provides, for at least a portion of an image, a grain value indicating whether it contains grain. According to certain embodiments, the grain classifier is pre-trained using a training set of representative marked images. As known to those versed in the field, in order to create an efficient and reliable classifier it is required to obtain a representative marked database including a training set of representative marked images and to identify or calculate informative features to be used in the classification process, and then use these features and the marked database to train the classifier.

The features described below may be extracted from a base image. As aforementioned, a base image is an image based on which the grain value can be calculated. It can be in some cases the input image itself, and in some other cases it can be an image derived from the input image. By way of example, the base image can be selected from a group comprising: the input image, a difference image between the input image and a filtered version of the input image, and a difference image between the input image and one or more adjacent images. In cases where the base image is a difference image between the input image and one or more adjacent images, the difference image can be obtained possibly after motion estimation to obtain lower energy difference images. In some cases multiple frames can be used, for example a previous and a future frame, to obtain a prediction for the pixels in the current frame and use the difference or residual between the prediction and the actual pixel value as a base image.

According to some embodiments of the disclosed subject matter, the one or more features can include a sub set of features indicative of distribution of pixel pairs in the base image and a spatially shifted version of the base image, e.g., shifts in different directions and by a different number of pixels. For example, the sub set of features can be obtained by calculating auto-correlation coefficients between pixel pairs in the base image and the spatially shifted version of the base image or, alternatively, a relation between the auto-correlation coefficients. Auto-correlation coefficients are a type of correlation coefficient. However, instead of calculating correlation between two different signals, the correlation is between two values of the same signal at different times or at different locations. Autocorrelation provides information on existence of periodic information in a signal, or, on the contrary, how random it is. In the presence of grain relatively low auto-correlation coefficients are expected.

According to yet other embodiments of the disclosed subject matter, the one or more features can include a sub set of features that are based on a per-block variance value or standard deviation value of the base image, which are indicative of extent of texture present in a block. A block in this context may be any size deemed appropriate—for example 4×4 pixels. An example of a suitable routine for computation of variance is the following:

The mean of B, an N×N block of values B[i][j] with i=1, . . . , N, j=1, . . . N is given by:

$$\text{mean}_{N\times N}(B) = \frac{1}{N^2} \sum_{i=1}^{N} \sum_{j=1}^{N} B[i][j]$$

Then, the variance of same block is computed as:

$$V_{N\times N}(B) = \frac{1}{N^2} \sum_{i=1}^{N} \sum_{j=1}^{N} |B[i][j] - \text{mean}_{N\times N}(B)|$$

i.e. the mean absolute difference between the block values and the block mean.

According to yet other embodiments of the disclosed subject matter, the one or more features can include a sub set of features that are the actual pixel values of the base image, which in this case is the input image. This can be beneficial for example for preventing falsely high grain values for specific content such as grass or ocean, for which some of the proposed features have values that are similar to the values obtained in the presence of grain.

According to yet other embodiments of the disclosed subject matter, the one or more features can include a sub set of features that are based on per-block Discrete cosine transform (DCT) coefficients of the base image, which in this case is the input image. For example, the sub set of features can be obtained by, for each of one or more blocks of the base image, calculating a ratio between high-frequency and mid-frequency DCT coefficients. In the presence of grain, high DCT coefficients are expected to have significant energy (high values), thus yielding a high ratio value. A block in this context may be any size deemed appropriate—for example 16×16 pixels.

According to yet other embodiments of the disclosed subject matter, the one or more features can include a sub set of features based on the distribution of per-block pixel value histograms. Exemplified histograms for non-grain and grain images can be found in FIGS. 7A and 7B respectively. Using the histograms, the dynamic range of pixels per block in a base image can be examined. It is expected for example, that, in the presence of grain, all blocks which contain grain will have at least a certain degree of dynamic range of associated pixel values. A block in this context may be any size deemed appropriate—for example 4×4 pixels, 32×32 pixels, or possibly even the entire frame.

Having described different sub sets of features, it is to be noted that the one or more features that are used to calculate the grain value can in some cases be any sub set of features as described above, or in some other cases can include a combination of one or more of different sub sets of features when appropriate.

It is also be noted that although the above mentioned one or more features and sub sets of features are described as being an input to machine learning based classification, these features can also be used to calculate a grain value directly, by applying various decisions and thresholding—along the lines of the embodiments described with reference to FIG. 5A. For example, the features of auto-correlation coefficients can be used directly as inputs to calculate the grain value without going through the machine learning based classification process.

According to yet further embodiments of the disclosed subject matter, the aforementioned one or more features may be extracted separately for different "sections" of the base image, giving rise to a plurality of per section feature values for each feature. This is beneficial due to the fact that grain strength is often signal-dependent. For example grain may have different magnitude according to the brightness levels of the underlying image pixels, such as stronger grain in dark areas than in bright ones. In this case different sections are divided such that each section corresponds to a different pixel brightness value interval. For example, assuming 8-bit pixel with values in the range 0-255, with 0 being the darkest and 255 being the brightest, by way of example the pixels can be split into intervals of increasing brightness of [0, 30] corresponding to very dark pixels, [31,100], [101,190] and [191,255] corresponding to very bright pixels. Then the features can be calculated separately for the pixels with values in the four sections, thus in this example yielding four feature values. It may also be beneficial to divide the image into spatial regions, calculating the feature for each region separately, in which case different sections are divided such that each section corresponds to a different spatial region of the base image. According to certain embodiments, for each feature, the plurality of per section feature values can be pooled together to obtain a combined feature value for the base image. Different features may require different pooling approaches, thus the pooling approach should take into account the specifics of each feature. By way of example, the pooling can comprise applying respective weighting to the plurality of per section feature values, and pooling the weighted plurality of per section feature values to obtain a combined feature value for the base image. For instance, in the example provided above it may be desired to give more weight in the pooling process to features calculated on dark pixel intervals than on bright pixel intervals. Further, the weights or technique used in the pooling process may take into consideration the lack of uniformity in the selected intervals, and, for example, give lower weight to the feature derived for interval [201,255] than for the feature derived from interval [102,200], since it is a smaller interval—i.e. covers a smaller dynamic range.

In the case of using machine learning to calculate the grain value based on the extracted features, it is also possible to use the per section feature values for each feature directly as multiple input to the machine learning classification.

Further, grain strength may differ between regions of a frame. For example, it may not be present in a logo overlay over the image, in black stripes at the top and bottom of the image, or other artificially added objects. Therefore, one or more pixels corresponding to outlier or marginal areas based on pixel values can be excluded from the base image, giving rise to a residual image, and the calculation of the grain value can be based on one or more features characterizing the residual image. By way of example, it can be proven beneficial to examine some simple measures or statistics, such as, e.g., the average, the range or the standard deviation of pixel values, at a block level, to identify pixels corresponding to outlier or marginal areas, and then exclude these pixels from the base image that is used for extracting features used for grain value calculation.

Further regarding the pooling of features over sections, there are provided some examples. In one example, for a feature based on a per-block standard deviation value, some sections may not have grain at all, thus using a maximum over feature values for all sections as the combined feature value may yield a good result. In yet another example some sections may contain "busy" textures, so using a maximum value will lead to falsely high values. Another possibility is to apply an averaging function on the per section feature values to obtain the combined feature value, but then, as mentioned above, care must be taken so that regions with outlier values do not skew the frame value. If an averaging function is used for pooling, outliers can distort the final decision. One option is to use averaging functions such as median or truncated mean or weighted geometric or arithmetic averaging. It is also possible to use more sophisticated pooling approaches. For example, the pooling can comprise analyzing per section pixel distribution, determining a pooling method based on the analyzing, and pooling the per section feature values to obtain a combined feature value according to the pooling method.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A computerized method of controlling a quality measure in a compression quality evaluation system, the method comprising:

calculating a grain value indicative of an extent of grain present in an input image, said grain value being calculated based on one or more features characterizing a base image related to the input image, wherein said base image is a difference image between the input image and a filtered version of the input image, and wherein said calculating a grain value indicative of an extent of grain present in an input image comprises:

applying a Low-Pass-Filter to the input image giving rise to the filtered version of the input image;

calculating absolute difference values between corresponding pixels of the input image and the filtered version of the input image giving rise to the difference image; and computing the grain value based on one or more features characterizing the difference image; and configuring the quality measure upon a grain criterion being met by said grain value, the quality measure being indicative of perceptual quality of a compressed image compressed from the input image.

2. The computerized method of claim 1, wherein the one or more features include a sub set of features indicative of distribution of pixel values in the difference image.

3. The computerized method of claim 1, wherein said Low-Pass-Filter is a 2-D smoothing filter.

4. The computerized method of claim 2, wherein said sub set of features are a percentage of the pixel values that lie within a predetermined range.

5. The computerized method of claim 2, wherein said sub set of features are a percentage of the pixel values that lie within a range that is dependent on one or more image characteristics, said image characteristics including maximum, minimum and average brightness of pixels in the input image.

6. The computerized method of claim 1, wherein said calculating a grain value indicative of an extent of grain present in an input image further comprises:

obtaining a preceding input image;

computing a frame similarity value between said input image and said preceding input image; and adapting said grain value according to the frame similarity value.

7. The computerized method of claim 6, wherein said computing a frame similarity value comprises calculating absolute difference values between corresponding pixels in said input image and said preceding input image.

8. The computerized method of claim 6, wherein said computing a frame similarity value comprises evaluating a percentage of corresponding pixels with identical values in said input image and said preceding input image.

9. The computerized method of claim 1, wherein said calculating a grain value indicative of an extent of grain present in an input image is based on machine learning, and further comprises:

performing a classification using a grain classifier based on said one or more features to determine the grain value.

10. The computerized method of claim 1, wherein said one or more features includes a sub set of features indicative of distribution of pixel pairs in the base image and a spatially shifted version of the base image.

11. The computerized method of claim 10, wherein said sub set of features are obtained by calculating auto-correlation coefficients between pixel pairs in the base image and the spatially shifted version of the base image.

12. The computerized method of claim 1, wherein said one or more features includes a sub set of features that are based on a per-block variance value of the base image.

13. The computerized method of claim 1, wherein said one or more features includes a sub set of features that are one or more pixel values of the base image, the base image being the input image.

14. The computerized method of claim 1, wherein said one or more features includes a sub set of features that are based on per-block Discrete cosine transform (DCT) coefficients of the base image, the base image being the input image.

15. The computerized method of claim 14, wherein the sub set of features are obtained by, for each of one or more blocks of the base image, calculating a ratio between high-frequency and mid-frequency DCT coefficients.

16. The computerized method of claim 1, wherein said one or more features includes a sub set of features that are based on distribution of per-block pixel value histograms.

17. The computerized method of claim 1, further comprising extracting said one or more features separately for different sections of the base image, giving rise to a plurality of per section feature values for each feature.

18. The computerized method of claim 17, wherein said different sections are divided such that each section corresponds to a different pixel brightness value interval.

19. The computerized method of claim 17, wherein said different sections are divided such that each section corresponds to a different spatial region of the base image.

20. The computerized method of claim 1, further comprising excluding, from the base image, one or more pixels corresponding to outlier or marginal areas based on pixel values, giving rise to a residual image, and wherein said calculating a grain value indicative of an extent of grain present in an input image is based on one or more features characterizing the residual image.

21. The computerized method of claim 1, wherein said configuring the quality measure upon a grain criterion being met by said grain value includes adjusting a quality criterion of the quality measure based on said grain value.

22. The computerized method of claim 1, wherein the quality measure includes an edge loss measure.

23. The computerized method of claim 22, wherein said configuring the quality measure upon a grain criterion being met by said grain value includes adjusting a threshold used to calculate the edge loss measure based on said grain value.

24. The computerized method of claim 23, wherein said threshold is an edge strength threshold used to determine if a pixel is an edge pixel.

25. The computerized method of claim 22, wherein said configuring the quality measure upon a grain criterion being met by said grain value includes adjusting weighting of the edge loss measure when incorporated into the quality measure according to said grain value.

26. The computerized method of claim 1, wherein the quality measure includes a texture measure.

27. The computerized method of claim 26, wherein said configuring the quality measure upon a grain criterion being met by said grain value includes adjusting weighting of the texture measure when incorporated into the quality measure according to said grain value.

28. A computerized system of controlling a quality measure in a compression quality evaluation system, the system comprising a processor operatively connected to a memory, the processor configured to:
calculate a grain value indicative of an extent of grain present in an input image, said grain value being calculated based on one or more features characterizing a base image related to the input image; and
configure the quality measure upon a grain criterion being met by said grain value, the quality measure being indicative of perceptual quality of a compressed image compressed from the input image;
wherein said base image is a difference image between the input image and a filtered version of the input image, and wherein the processor is configured to calculate a grain value indicative of an extent of grain present in an input image by:
applying a Low-Pass-Filter to the input image giving rise to the filtered version of the input image;
calculating absolute difference values between corresponding pixels of the input image and the filtered version of the input image giving rise to the difference image; and
computing the grain value based on one or more features characterizing the difference image.

29. The computerized system of claim 28, wherein the one or more features include a sub set of features indicative of distribution of pixel values in the difference image.

30. The computerized system of claim 28, wherein said calculating a grain value indicative of an extent of grain present in an input image is based on machine learning, the calculating comprising:
performing a classification using a grain classifier based on said one or more features to determine the grain value.

31. The computerized system of claim 28, wherein said one or more features includes a sub set of features that are based on distribution of per-block pixel value histograms.

32. The computerized system of claim 28, wherein the processor is further configured to extract said one or more features separately for different sections of the base image, giving rise to a plurality of per section feature values for each feature.

33. A non-transitory computer readable storage medium tangibly embodying a program of instructions executable by a computer to control a quality measure in a compression quality evaluation system, comprising the steps of the following:
calculating a grain value indicative of an extent of grain present in an input image, said grain value being calculated based on one or more features characterizing a base image related to the input image, wherein said base image is a difference image between the input image and a filtered version of the input image, and wherein said calculating a grain value indicative of an extent of grain present in an input image comprises:
applying a Low-Pass-Filter to the input image giving rise to the filtered version of the input image;
calculating absolute difference values between corresponding pixels of the input image and the filtered version of the input image giving rise to the difference image; and
computing the grain value based on one or more features characterizing the difference image; and
configuring the quality measure upon a grain criterion being met by said grain value, the quality measure being indicative of perceptual quality of a compressed image compressed from the input image.

34. A computerized method of controlling a quality measure in a compression quality evaluation system, the method comprising:
calculating a grain value indicative of an extent of grain present in an input image, said grain value being calculated based on one or more features characterizing a base image related to the input image, wherein said calculating a grain value indicative of an extent of grain present in an input image is based on machine learning and comprises performing a classification using a grain classifier based on said one or more features to determine the grain value; and configuring the quality measure upon a grain criterion being met by said grain value, the quality measure being indicative of perceptual quality of a compressed image compressed from the input image.

35. A computerized method of controlling a quality measure in a compression quality evaluation system, the method comprising:
   calculating a grain value indicative of an extent of grain present in an input image, said grain value being calculated based on one or more features characterizing a base image related to the input image, wherein said calculating a grain value indicative of an extent of grain present in an input image further comprises:
      obtaining a preceding input image;
      computing a frame similarity value between said input image and said preceding input image; and
      adapting said grain value according to the frame similarity value; and
   configuring the quality measure upon a grain criterion being met by said grain value, the quality measure being indicative of perceptual quality of a compressed image compressed from the input image.

36. A computerized method of controlling a quality measure in a compression quality evaluation system, the method comprising:
   calculating a grain value indicative of an extent of grain present in an input image, said grain value being calculated based on one or more features characterizing a base image related to the input image; and
   configuring the quality measure upon a grain criterion being met by said grain value, comprising adjusting a quality criterion of the quality measure based on said grain value, the quality measure being indicative of perceptual quality of a compressed image compressed from the input image.

37. A computerized system of controlling a quality measure in a compression quality evaluation system, the system comprising a processor operatively connected to a memory, the processor configured to:
   calculate a grain value indicative of an extent of grain present in an input image, said grain value being calculated based on one or more features characterizing a base image related to the input image; and
   configuring the quality measure upon a grain criterion being met by said grain value, the quality measure being indicative of perceptual quality of a compressed image compressed from the input image;
   wherein the processor is configured to calculate a grain value indicative of an extent of grain present in an input image based on machine learning by performing a classification using a grain classifier based on said one or more features to determine the grain value.

38. A non-transitory computer readable storage medium tangibly embodying a program of instructions executable by a computer to control a quality measure in a compression quality evaluation system, comprising the steps of the following:
   calculating a grain value indicative of an extent of grain present in an input image, said grain value being calculated based on one or more features characterizing a base image related to the input image, wherein said calculating a grain value indicative of an extent of grain present in an input image is based on machine learning and comprises performing a classification using a grain classifier based on said one or more features to determine the grain value; and
   configuring the quality measure upon a grain criterion being met by said grain value, the quality measure being indicative of perceptual quality of a compressed image compressed from the input image.

* * * * *